United States Patent
Leitner et al.

(10) Patent No.: US 9,059,931 B2
(45) Date of Patent: Jun. 16, 2015

(54) SYSTEM AND METHOD FOR VISUALIZING AN ADDRESS SPACE

(75) Inventors: Stefan H. Leitner, Heidelberg (DE); Jens Doppelhamer, Ladenburg (DE); Wolfgang Mahnke, Hettelleideheim (DE)

(73) Assignee: ABB AG, Mannheim (DE)

( * ) Notice: Subject to any disclaimer, the term of this patent is extended or adjusted under 35 U.S.C. 154(b) by 540 days.

(21) Appl. No.: 13/162,808

(22) Filed: Jun. 17, 2011

(65) Prior Publication Data

US 2011/0307793 A1   Dec. 15, 2011

Related U.S. Application Data

(63) Continuation of application No. PCT/EP2009/008963, filed on Dec. 15, 2009.

(30) Foreign Application Priority Data

Dec. 19, 2008  (DE) .................. 10 2008 063 944

(51) Int. Cl.
*G06F 15/177* (2006.01)
*H04L 12/24* (2006.01)
(Continued)

(52) U.S. Cl.
CPC .............. *H04L 41/22* (2013.01); *H04L 12/28* (2013.01); *G06F 3/0481* (2013.01); *H04L 41/12* (2013.01)

(58) Field of Classification Search
CPC ... H04L 12/2602; H04L 43/00; H04L 43/045; G06F 3/0481; G06F 9/4443; G09G 5/14
USPC ................... 715/736, 734, 764, 781; 709/223
See application file for complete search history.

(56) References Cited

U.S. PATENT DOCUMENTS

| | | |
|---|---|---|
| 5,892,953 A | 4/1999 | Bhagria et al. |
| 6,470,383 B1 | 10/2002 | Leshem et al. |

(Continued)

FOREIGN PATENT DOCUMENTS

DE   101 38 232 A1   5/2002

OTHER PUBLICATIONS

Pyron, Tim, Special Edition Using Microsoft Office® Project 2003, Feb. 3, 2004, Que, http://techbus.safaribooksonline.com/book/office-and-productivity-applications/0789730723, pp. 1, 170.*

(Continued)

*Primary Examiner* — Tadeese Hailu
*Assistant Examiner* — Joy M Weber
(74) *Attorney, Agent, or Firm* — Buchanan Ingersoll & Rooney PC

(57) ABSTRACT

The disclosure relates to a method and to corresponding systems for visualizing an address space and for organizing automation-related data, wherein according to a first method variant the user interface of a display device of a computer system is divided into a plurality of configurable address space display regions. Each address space display region is divided into a first partial region and into a second partial region, wherein the address space display regions all represent a same address space that can be chosen by a user. In the first partial regions, the node network of the address space is visualized in different display modes. In the second partial regions, details of a node chosen by the user are displayed. When the user navigates in one of the first partial regions and carries out a change to the node network, the structure of the node network and relations between the nodes in all first partial regions are automatically synchronized.

12 Claims, 7 Drawing Sheets

(51) Int. Cl.
*H04L 12/28* (2006.01)
*G06F 3/0481* (2013.01)

(56) References Cited

U.S. PATENT DOCUMENTS

| | | | |
|---|---|---|---|
| 6,640,238 B1* | 10/2003 | Bowman-Amuah | 709/201 |
| 6,704,737 B1 | 3/2004 | Nixon et al. | |
| 7,774,444 B1* | 8/2010 | George et al. | 709/223 |
| 2004/0107277 A1* | 6/2004 | Levesque et al. | 709/223 |
| 2005/0144271 A1* | 6/2005 | Shirane et al. | 709/223 |
| 2005/0198247 A1* | 9/2005 | Perry et al. | 709/223 |
| 2006/0069689 A1 | 3/2006 | Karklins et al. | |
| 2006/0242164 A1* | 10/2006 | Evans et al. | 707/100 |
| 2006/0256736 A1* | 11/2006 | Koehler et al. | 370/254 |
| 2007/0053368 A1 | 3/2007 | Chang et al. | |
| 2008/0070495 A1 | 3/2008 | Stricklen et al. | |

OTHER PUBLICATIONS

Koirala, Shivprasad, Project Management FAQ, Oct. 22, 2008, Code Project, http://www.codeproject.com/Articles/29753/Project-Management-FAQ, pp. 1-15.*

Tamara Munzner, H3Viewer, May 9, 2002, Stanford Graphics Education webpages, pp. 1-27.*

Michael Kalkusch, Visualization Hall of Fame 2006, Aug. 10, 2006, Technische Universität Wien webpages, pp. 1-7.*

International Search Report (PCT/ISA/210) issued on Apr. 21, 2010, by European Patent Office as the International Searching Authority for International Application No. PCT/EP2009/008963.

German Search Report issued Mar. 26, 2009.

* cited by examiner

SYSTEM AND METHOD FOR VISUALIZING AN ADDRESS SPACE

RELATED APPLICATIONS

This application claims priority as a continuation application under 35 U.S.C. §120 to PCT/EP2009/008963, which was filed as an International Application on Dec. 15, 2009 designating the U.S., and which claims priority to German Application 10 2008 063 944.3 filed in Germany on Dec. 19, 2008. The entire contents of these applications are hereby incorporated by reference in their entireties.

FIELD

The disclosure relates to a method and a system for visualizing a single address space on the user interface of a display system, such as a display of an automation system. Exemplary methods and the devices as disclosed herein are suitable for different applications, such as for visualizing a large address space with a meshed network of nodes for the purpose of organizing automation-related data.

BACKGROUND INFORMATION

Address spaces (or name spaces), which can include related nodes, are used for presenting information models. Such information models may be products from individual manufacturers, such as the "ABB Aspect Object Model" from the ABB company, or standardized information models which define information presentation for particular applications, such as the OPC UA information model. OPC UA is a standard protocol specified by the OPC Foundation for manufacturer-independent communication, such as in process automation. The ABB Aspect Object Model is a model which presents data and characteristics (aspects) of a real object as software components and which—through the use of a single integrated architecture—simplifies the integration of different appliances and systems.

Graphical user interfaces (GUIs) which use such models can include powerful mechanisms for presenting address spaces in a manner which is suitable for the user. In principle, there are many different paradigms and approaches for visualizing address spaces, such as trees, lists and graphs. For example, customary is the use of a tree structure for different purposes, often also in connection with lists or tables. Although other paradigms can have advantages in some cases, the tree structure is used in many instances of application. For example, in the field of industrial automation, the tree presentation is a first choice for visualizing address spaces on account of the simplicity thereof. However, this very advantage can become a disadvantage when working with large address spaces with a meshed network of nodes, such as in the case of the OPC UA information model or in the case of the ABB Aspect Object Model. In such a case, visualization paradigms which show more details than trees would simplify work with the model and also understanding for some tasks.

SUMMARY

A method is disclosed for visualizing an address space and for organizing automation-related data, comprising: dividing a user interface of a display device in a computer system into a plurality of configurable address space display regions; splitting address space display region into a first subregion and a second subregion, wherein the address space display regions all represent a same address space which can be selected by a user; visualizing a node network of the address space in the first subregion in a different mode of presentation in different visualization components; and presenting details of a node selected by the user in the second subregion; wherein when a user is navigating in one of the first subregions and makes a change on the node network, a structure of the node network and relationships between nodes are automatically synchronized in all the first subregions.

A method is also disclosed for visualizing an address space and for organizing automation-related data, comprising: dividing a user interface of a display device in a computer system into a plurality of configurable address space display regions; splitting each address space display region into a first subregion and a second subregion, wherein the address space display regions all represent a same address space which can be selected by a user; visualizing a respective node network of the address spaces in the first subregions in a different mode of presentation in different visualization components; and presenting respective details of a node selected by the user in the second subregions; wherein the visualization components are independent of one another during navigation; and wherein when the user uses a drag-and-drop method to drag a node from one of the first subregions into another first subregion, all relationships between existing nodes and a newly added node are automatically presented in a target presentation.

A system is disclosed for visualizing an address space and for organizing automation-related data, comprising: a display device in a computer system; a user interface divided into a plurality of configurable address space display regions, each address space display region being split into a first subregion and a second subregion, wherein the address space display regions all represent a same address space which can be selected by a user; the first subregions being configured to visualize a node network of the address space in a different mode of presentation, and the second subregions being configured to present details of a node selected by a user; and a component configured to automatically synchronize a presentation of a structure of the node network, and also relationships between the nodes, in all the first subregions when a user is navigating in one of the first subregions and to make a change on the node network.

A system is also disclosed for visualizing an address space and for organizing automation-related data, comprising: a display device in a computer system; a user interface divided into a plurality of configurable address space display regions, each address space display region being split into a first subregion and a second subregion, wherein the address space display regions all represent a same address space; the first subregions being configured to visualize a node network of the address space in a different mode of presentation in different visualization components, and the second subregions being configured to present details of a node selected by a user; and a component configured to automatically present all relationships between existing nodes and a newly added node in a target presentation when a user drags a node from one of the first subregions into another first subregion.

BRIEF DESCRIPTION OF THE DRAWINGS

A further explanation of exemplary embodiments of the disclosure and advantages thereof, and also a further explanation of features which distinguish over the state of the art, can be found in the following description of exemplary embodiments with reference to the figures of the drawings, in which.

DETAILED DESCRIPTION

As disclosed herein, exemplary embodiments are provided for visualizing automation-related data which can allow many details to be presented while avoiding disadvantages of known visualizations.

For example, a method is disclosed for visualizing an address space and for organizing automation-related data.

Exemplary embodiments can provide a user interface with a plurality of configurable display regions which all show the same address space in a different mode of presentation. During navigation through an address space and following changes in the node network which are, for example, made for the purpose of organizing automation-related data, a first exemplary variant automatically results in synchronization of a presentation in respective other display regions. In a second exemplary variant, dragging of a node from one display region to another display region can be automatically followed by all relationships between existing nodes and a newly added node being presented in a target region.

For visualizing data which are handled in an automation system, such as current measured values or configuration data, there are two solutions: either there is a particular graphical user interface (process graphic) tailored to a particular system, or use is made of general mechanisms.

A solution based on the present disclosure can involve the use of general mechanisms for presenting automation-related data. For application in automation systems, known visualization systems can provide a fixed mode of presentation, as in the case of the OPC UA information model, for example. Presentation based on a tree structure can be used; more advanced tools use presentation based on a graphic or on a table. In the case of such applications, a first portion of the graphical user interface is defined for interactive navigation through the address space, which organizes automation data, and a second portion is defined for the presentation of details of a currently selected node.

Figure 1:
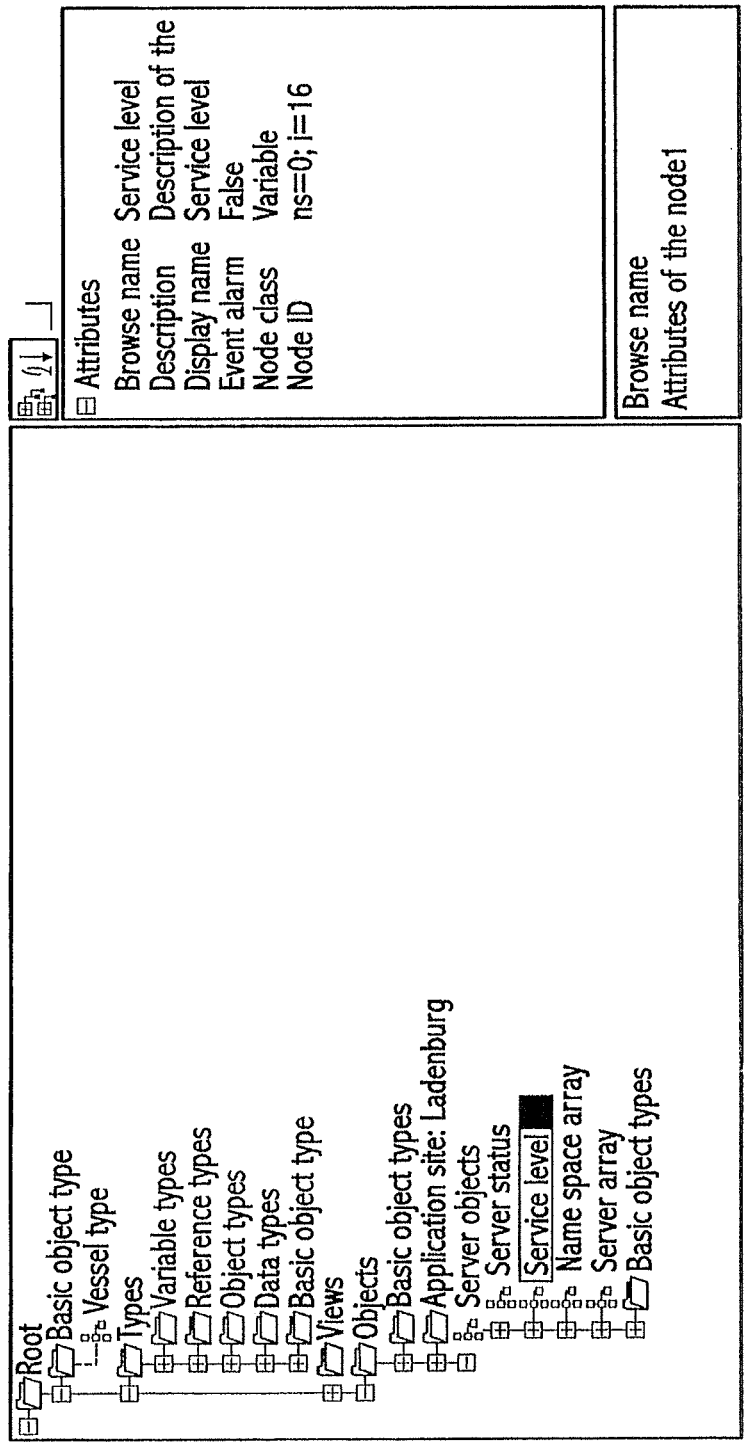
FIG. 1 shows an example of known visualization of an address space.

FIG. 1 shows such a known example with presentation based on a tree structure (on the left-hand side of FIG. 1), and wherein details of a selected node are shown in a table-related view (on the right-hand side of FIG. 1). In the case of such a solution, the presentation options are limited by virtue of the graphical user interface showing the address space using only one predefined mode of presentation. The visualization of a meshed network of nodes, which represents the address space, by means of a display component based on a tree structure results in simplified presentation of the address space. Although this can be advantageous for rapid navigation through the address space, it can be disadvantageous if the structure and the node dependencies are to be examined, because the tree structure does not show all of the available information. Furthermore, visualization of a meshed node network by a tree structure can result in recursions of underlying tree structures and in multiple presentations of the same node in several portions of the tree structure. Although another known mode of visualization, namely graphic-based visualization of the address space, can have an advantage of clear presentation of the meshed node network with all its details, it can have disadvantages when the intention is to navigate through an address space with a multiplicity of nodes in order to obtain an overview of the entire structure.

Other known modes of visualization, such as what are known as globe-like views (see H3Viewer, T. Munzner or radial views (see Animated Exploration of Dynamic Graphs with Radial Layout) may be more advantageous in such a case, but have drawbacks in other respects. Thus, known visualization solutions have specific advantages, but the use of just one respective mode of visualization for a user interface can limit the ways for the user to work with the address space.

Figure 2:
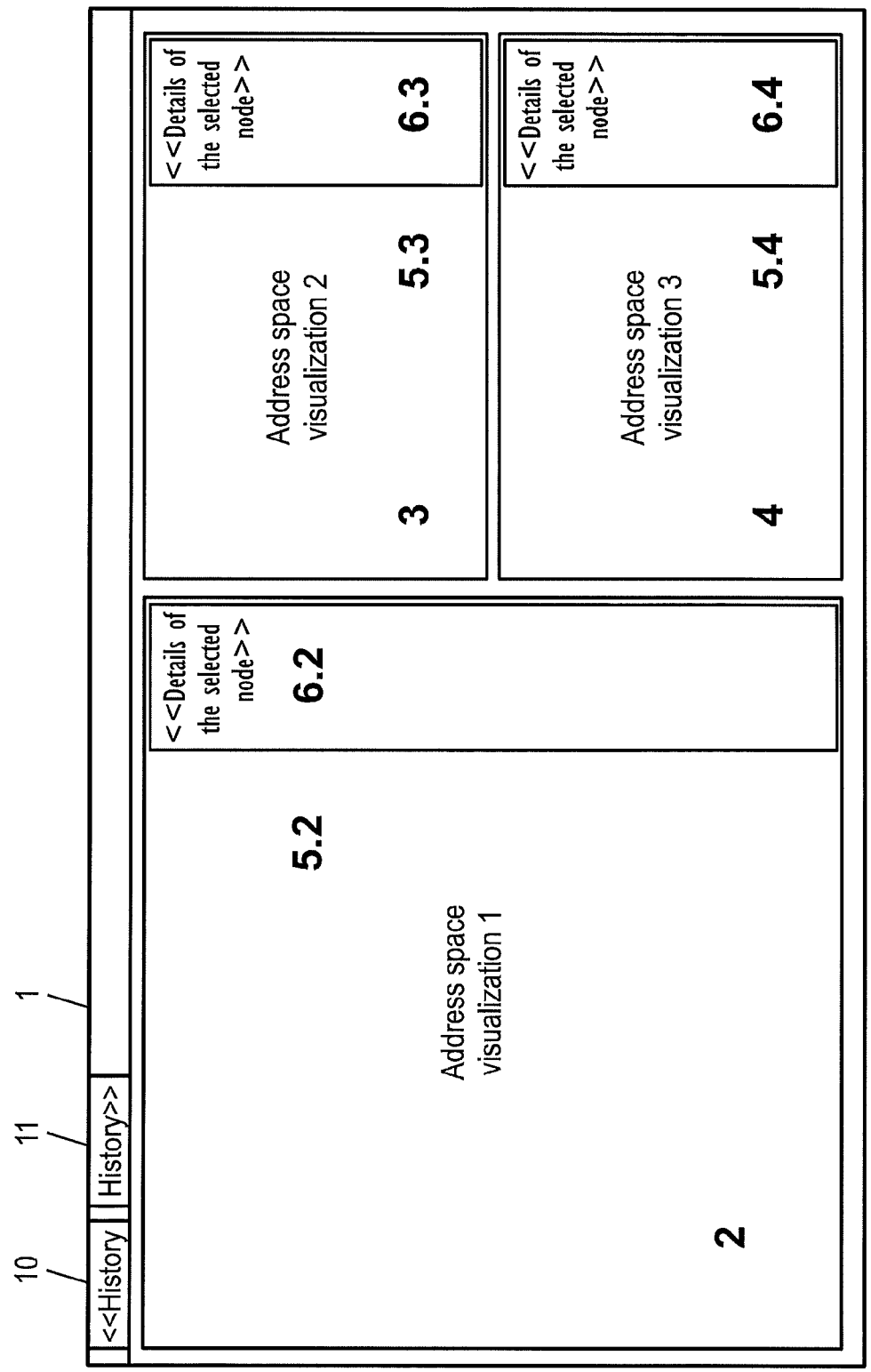
FIG. 2 shows an exemplary presentation of an address space in a plurality of display regions based on the present disclosure.
Figure 3:
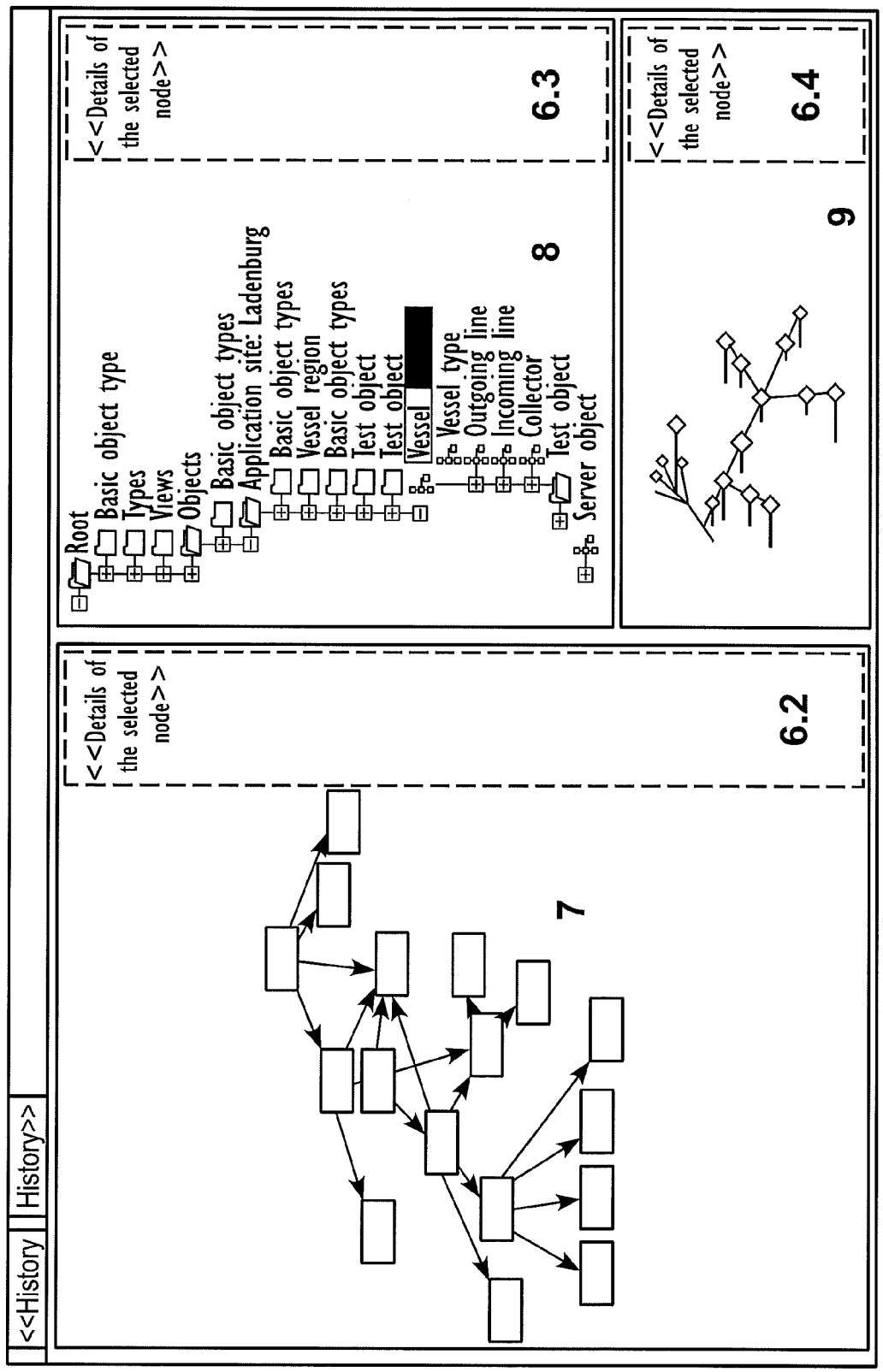
FIG. 3 shows examples of different presentations of a single address space in three display regions.

Exemplary methods and systems as disclosed herein can be used to provide a plurality of configurable visualizations for a single address space on a user interface 1 for organizing automation-related data. In this case, the graphical user interface 1 can be divided into a plurality of address space display regions 2, 3, 4—as shown in FIG. 2. Each region 2, 3, 4 can visualize the address space by means of a specific display component (as shown in FIG. 3) which is configured by the user. Each region 2, 3, 4 has a first portion 5.2, 5.3, 5.4 which allows navigation through the address space and a second portion 6.2, 6.3, 6.4 which shows details of a selected node.

The aforementioned user interface 1 of a display device in a computer system may be part of an automation system, such as a process control system, for example (e.g., having one or more components in the form of processors or software modules for each function).

To further clarify an exemplary solution according to the disclosure, FIG. 3 shows an exemplary presentation of different views of a particular address space in the first subregions 5.2, 5.3, 5.4 of the visualization regions 2, 3, 4. In this case, three configured visualization components 7, 8, 9 are presented, namely displays which are based on a graphic 7, a tree structure 8 and a 3D presentation 9, all of them representing the same address space.

In addition to the presentation of a current configuration for the address space in the display regions 2, 3, 4, it is also possible to navigate back to earlier configurations. In this case, the respective presentation in all three visualization regions 2, 3, 4 changes. Such navigation back into history can be effected using a first button 10, for example, which is respectively shown in the top left-hand corner of the user interface 1 in FIGS. 2 and 3. From an earlier configuration, it is possible to navigate forward to more recent configurations again using a second button 11, which is arranged next to the first button 10.

Figure 4:
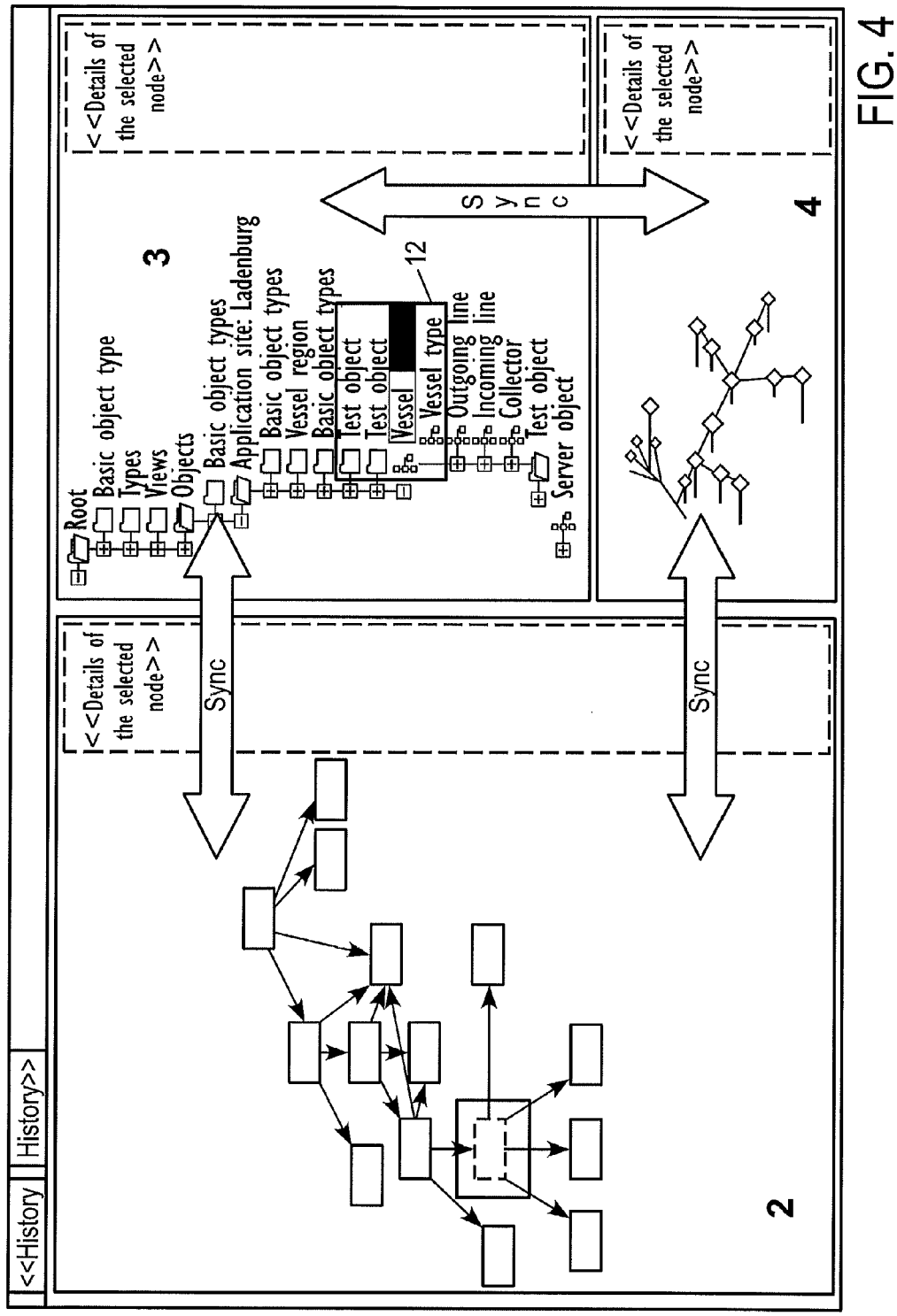
FIG. 4 shows navigation option based on a first exemplary method.

For navigation through the address space, two optional exemplary method variants are proposed:

Method Variant 1:

The first method variant is explained with reference to FIG. 4. In all the visualization regions 2, 3, 4 of the user interface 1, the same node structure of the address space with its nodes and the relationships among them is visualized. In this case, all the presentations in the visualization regions 2, 3, 4 are automatically synchronized when a user navigates through the address space and makes changes in one of the visualization regions 2, 3, 4 (e.g., adds or removes nodes). A change in the address space can be made using a mouse or a keyboard, for example. In order to simplify the work, a node selected within one of the visualization regions 2, 3, 4 (e.g., in the tree structure in the region 3), is automatically marked, for example using a conspicuous (e.g. red), frame 12. In the other two presentations in the regions 2 and 4 too, the selected node, which is the same in all the regions, can be automatically marked in the same way.

When navigating back in the navigation history, earlier configurations of the nodes are shown in all the visualization regions 2, 3, 4, and accordingly also when navigating forward.

Apart from the different presentations in the individual visualization regions 2, 3, 4, it can be advantageously also possible for some other parameters to be configured by the user in one of the regions 2, 3, 4, which affects all the visualization components 7, 8, 9 on account of the synchronization. By way of example, such parameters may be:
- starting node, that is to say the node at which the navigation starts;
- relationship type, as a result of which only the selected specific type of relationships between nodes is presented;
- node type, as a result of which only selected node types are presented;
- maximum number of nodes respectively shown in the visualization regions 2, 3, 4.

Method Variant 2:

The second exemplary method variant is explained with reference to FIGS. 5 and 6. Unlike in the case of the first variant, in this case the configured visualization components 7, 8, 9 are independent of one another when navigating through the address space. This means that the visualization components 7, 8, 9 may have different selected nodes, and also different sets of reduced or extended nodes, and can also show different types of relationships. Different selected nodes in the visualization components 7, 8, 9 are identified in different ways, for example by means (e.g., a processor) for producing boxes of different color. By way of example, in FIG. 5, a node selected in the display region 5.4 is identified therein by means for producing a dashed box 14, in order to distinguish it from a non-matching node 13 in the display region 5.3.

Figure 5:
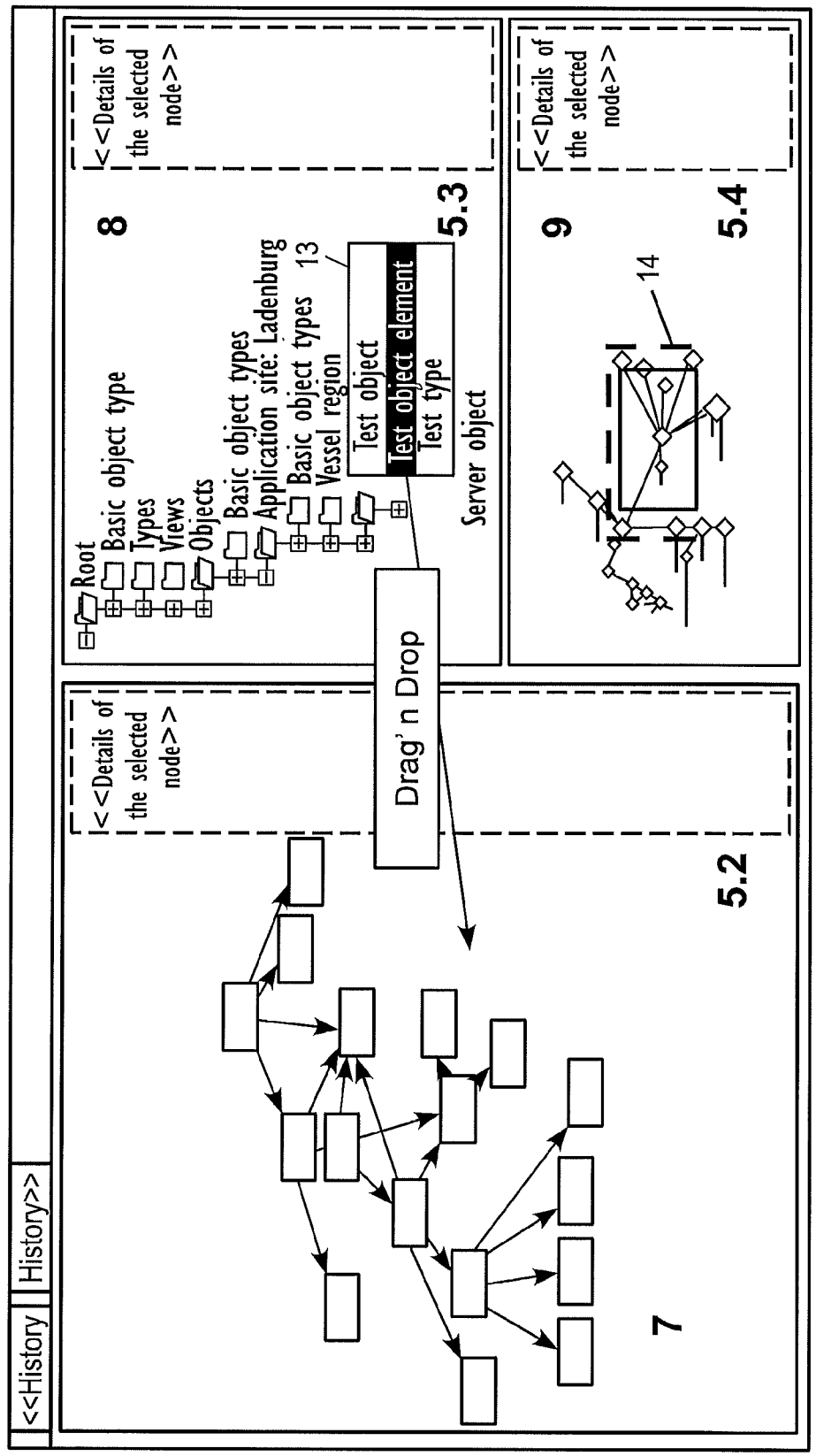
FIG. 5 and FIG. 6 show moving nodes to a different display region based on a second exemplary method.
Figure 6:
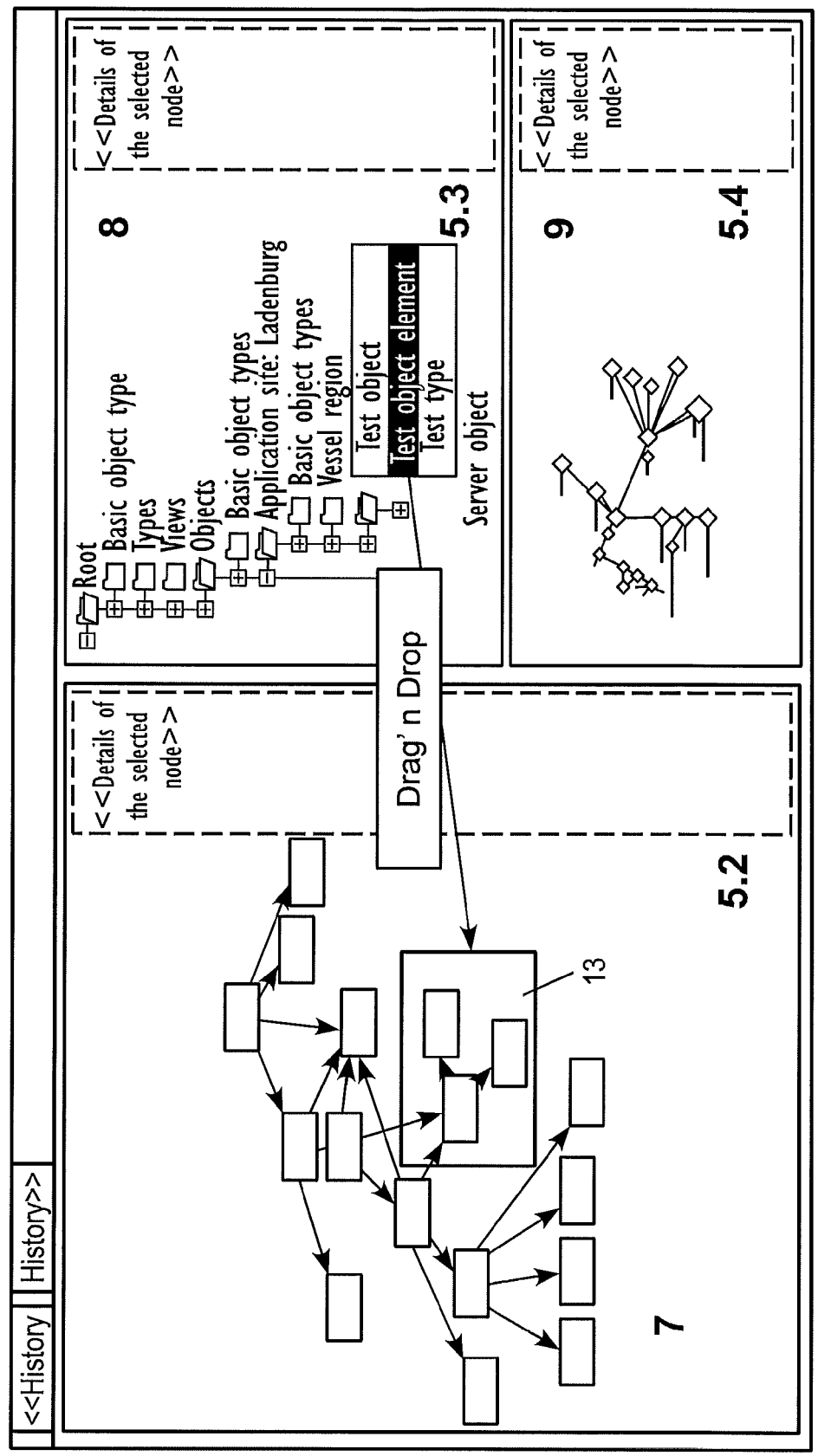

When a known drag-and-drop method is used in one of the visualization components (e.g., 8), to capture and drag a node 13, for example using a mouse key, as shown in FIG. 5, and to drop it in another visualization component (e.g., 7), the target presentation, in this case the component 7, shows all the relationships between the existing nodes and the newly added node 13, for example by means of arrows, as illustrated in FIG. 6.

When navigating back in the navigation history, earlier node configurations are shown only in the visualization component which is active at the respective time. By way of example, the visualization component 7, 8 or 9 last identified by a mouse click is active. Accordingly, more recent configurations are shown when navigating forward.

In addition to the visualization type which can be selected for each individual one of the visualization regions 2, 3, 4, it is also possible for the user to configure a few other parameters. By way of example, such parameters may be:
- the starting node, that is to say the node at which navigation starts;
- the relationship type, as a result of which only selected specific types of relationships between nodes are presented;
- the node type, as a result of which only selected node types are presented;
- the maximum number of nodes respectively shown in the visualization regions 2, 3, 4.

Figure 7:
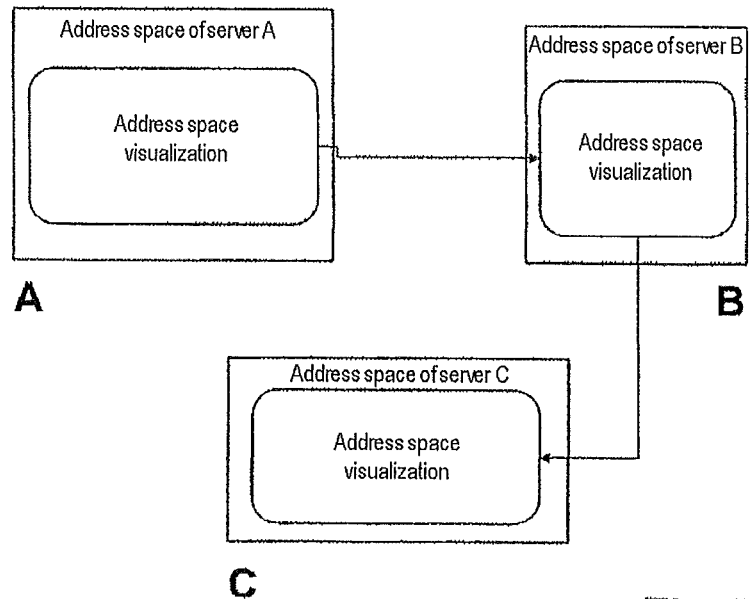
FIG. 7 and FIG. 8 show presentations of exemplary relationships between servers.
Figure 8:
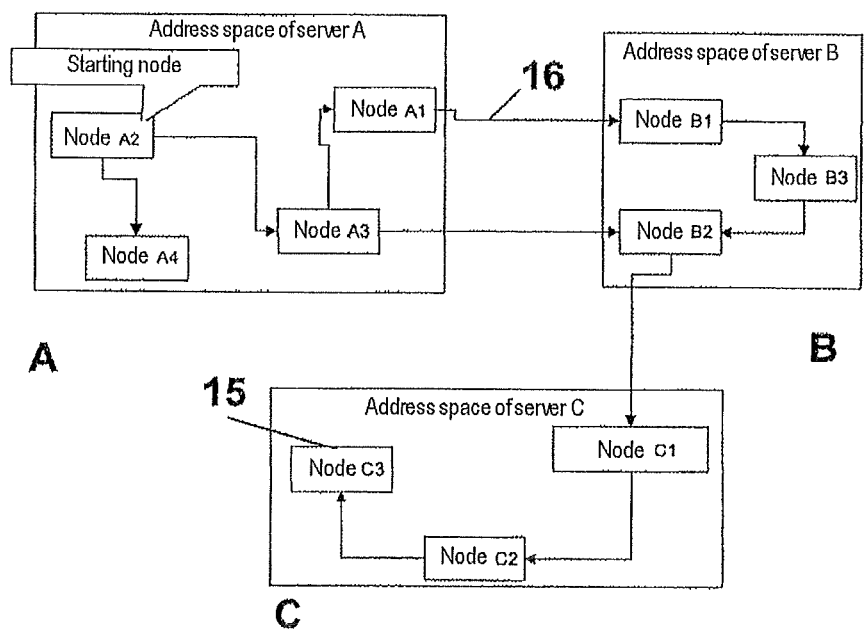

For both method variants 1 and 2, the following can apply jointly:

When a user navigates through an address space which extends over a plurality of servers, the respective server boundaries are visualized in a geometric shape in the differently configured visualization regions; in a 2D presentation or a 3D presentation, depending on the visualization type in the individual visualization regions. FIG. 7 shows an address space which extends over three servers A, B and C, the relationships between the servers being indicated by means which produce arrows. FIG. 8 shows an example of an address space which likewise extends over three servers A, B, C, and the relationships between the servers A, B, C and also nodes 15 are likewise indicated by means which produce arrows 16, a graphic-based presentation being provided.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come Within the meaning and range and equivalence thereof are intended to be embraced therein.

What is claimed is:

1. A method for visualizing an address space and for organizing automation-related data, comprising:
    dividing a user interface of a display device in a computer system into a plurality of configurable address space display regions;
    splitting each of the address space display regions into a first subregion and a second subregion, wherein the address space display regions all represent a same address space in different modes of presentation which can be selected by a user;
    visualizing a node network of the address space in each of the first subregions in the different modes of presentation;
    visualizing relationships between nodes and servers by a graphic based presentation in at least two address space display regions of the plurality of address space display regions;
    presenting details of a node selected by the user in the second subregions; and
    automatically synchronizing in all the first subregions a structure of the node network and relationships between nodes when the user is navigating in one of the first subregions and makes a change on the node network.

2. The method as claimed in claim 1, wherein when the user navigates back in a navigation history, earlier node configurations are automatically shown in all the display regions, and when the user navigates forward respective node configurations are also shown.

3. The method as claimed in claim 2, wherein a node which is selected by the user in one of the first subregions is marked conspicuously in all the first subregions.

4. The method as claimed in claim 1, wherein a node which is selected by the user in one of the first subregions is marked conspicuously in all the first subregions.

5. The method as claimed in claim 1, wherein when navigation is effected in an address space which extends over a plurality of servers, respective server boundaries are visualized in a geometric shape.

6. A method for visualizing an address space and for organizing automation-related data, comprising:
- dividing a user interface of a display device in a computer system into a plurality of configurable address space display regions;
- splitting each of the address space display regions into a first subregion and a second subregion, wherein the address space display regions all represent a same address space in different modes of presentation which can be selected by a user;
- visualizing a respective node network of the address space in each of the first subregions in the different modes of presentation;
- visualizing relationships between nodes and servers by a graphic based presentation in at least two address space display regions of the plurality of address space display regions;
- presenting respective details of a node selected by the user in the second subregions; and
- wherein when the user uses a drag-and-drop method to drag the node from one of the first subregions into another first subregion, all relationships between existing nodes and a newly added node are automatically presented in a target presentation.

7. The method as claimed in claim 6, wherein when navigation is effected in an address space which extends over a plurality of servers, respective server boundaries are visualized in a geometric shape.

8. A system for visualizing an address space and for organizing automation-related data, comprising:
- a display device in a computer system;
- a user interface divided into a plurality of configurable address space display regions, each of the address space display regions being split into a first subregion and a second subregion, wherein the address space display regions all represent a same address space in different modes of presentation which can be selected by a user;
- the first subregions being configured to visualize a node network of the address space in the different modes of presentation, and the second subregions being configured to present details of a node selected by a user, and at least two address space display regions of the plurality of address space display regions visualize relationships between nodes and servers by a graphic based presentation; and
- a component configured to automatically synchronize a presentation of a structure of the node network, and also relationships between the nodes, in all the first subregions when the user is navigating in one of the first subregions and to make a change on the node network.

9. The system as claimed in claim 8, wherein the display device is configured such that when the user navigates back in a navigation history, the display device will automatically show earlier node configurations in all the display regions, and when the user navigates forward the display device will show more recent node configurations.

10. The system as claimed in claim 8, configured to mark the node, which has been selected by the user in one of the first subregions, in all the first subregions.

11. A system for visualizing an address space and for organizing automation-related data, comprising:
- a display device in a computer system;
- a user interface divided into a plurality of configurable address space display regions, each of the address space display regions being split into a first subregion and a second subregion, wherein the address space display regions all represent a same address space in different modes of presentation;
- the first subregions being configured to visualize a node network of the address space in the different modes of presentation, and the second subregions being configured to present details of a node selected by a user, and at least two address space display regions of the plurality of address space display regions visualize relationships between nodes and servers by a graphic based presentation; and
- a component configured to automatically present all relationships between existing nodes and a newly added node in a target presentation when the user drags the node from one of the first subregions into another first subregion.

12. The system as claimed in claim 11, configured to mark the node, which has been selected by the user in one of the first subregions, in all the first subregions.

* * * * *